Dec. 22, 1936.　　　J. L. SIMMONS　　　2,065,102
FORMING MACHINE
Filed June 26, 1934　　　4 Sheets-Sheet 1
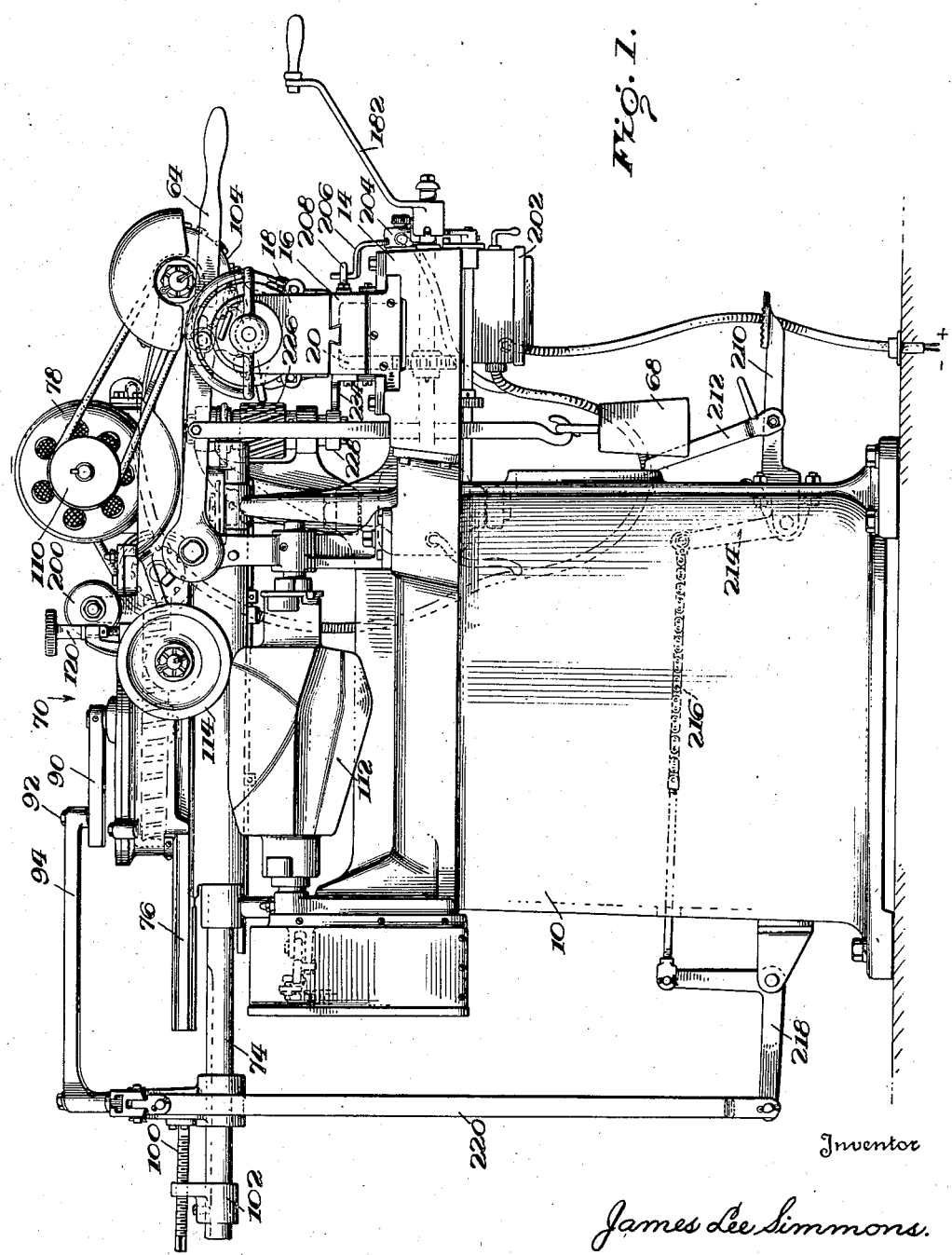
Inventor
James Lee Simmons.
By Edwin S. Booth
Attorney Dec. 22, 1936.  J. L. SIMMONS  2,065,102
FORMING MACHINE
Filed June 26, 1934   4 Sheets-Sheet 2
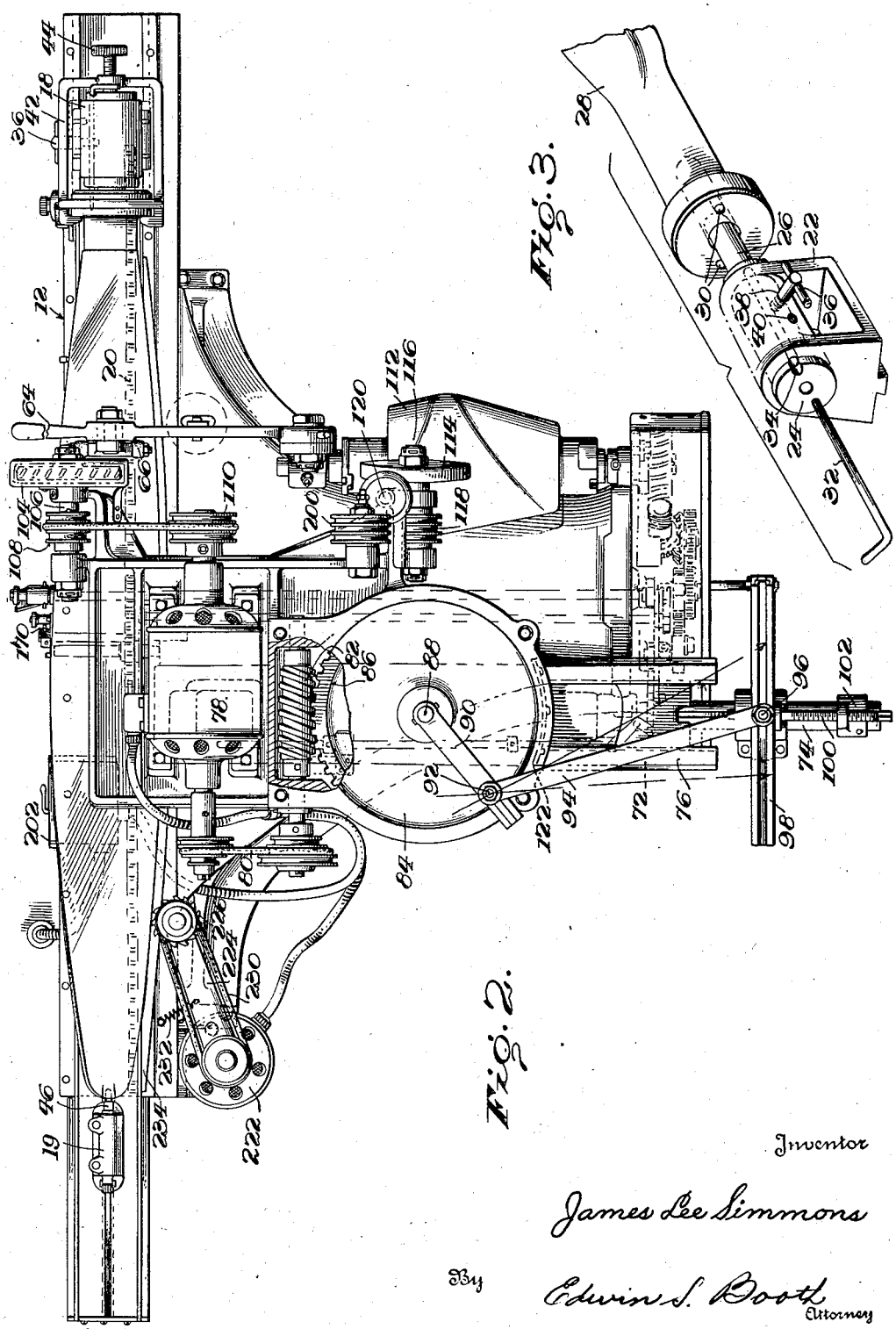
Inventor
James Lee Simmons
By Edwin S. Booth
Attorney

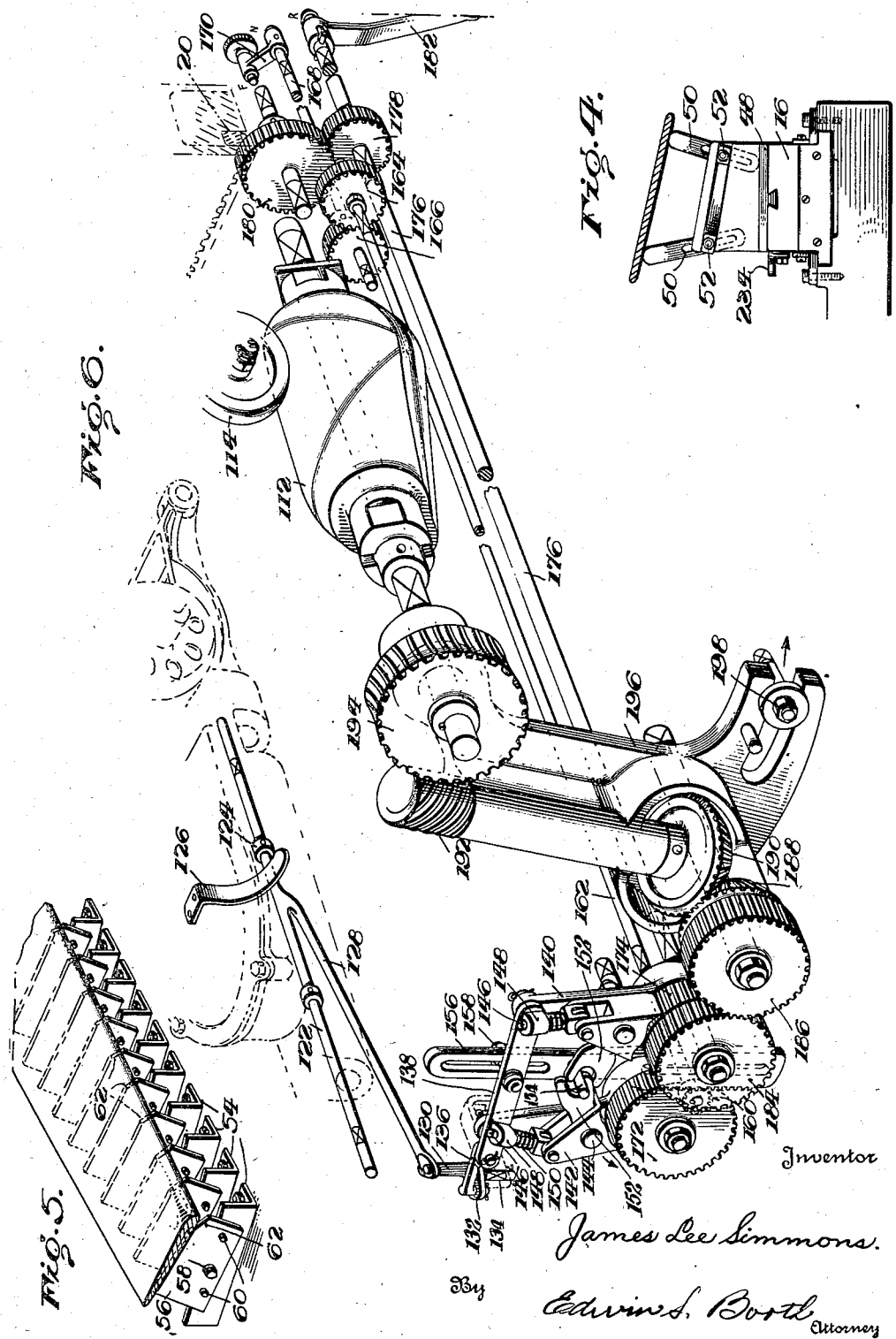

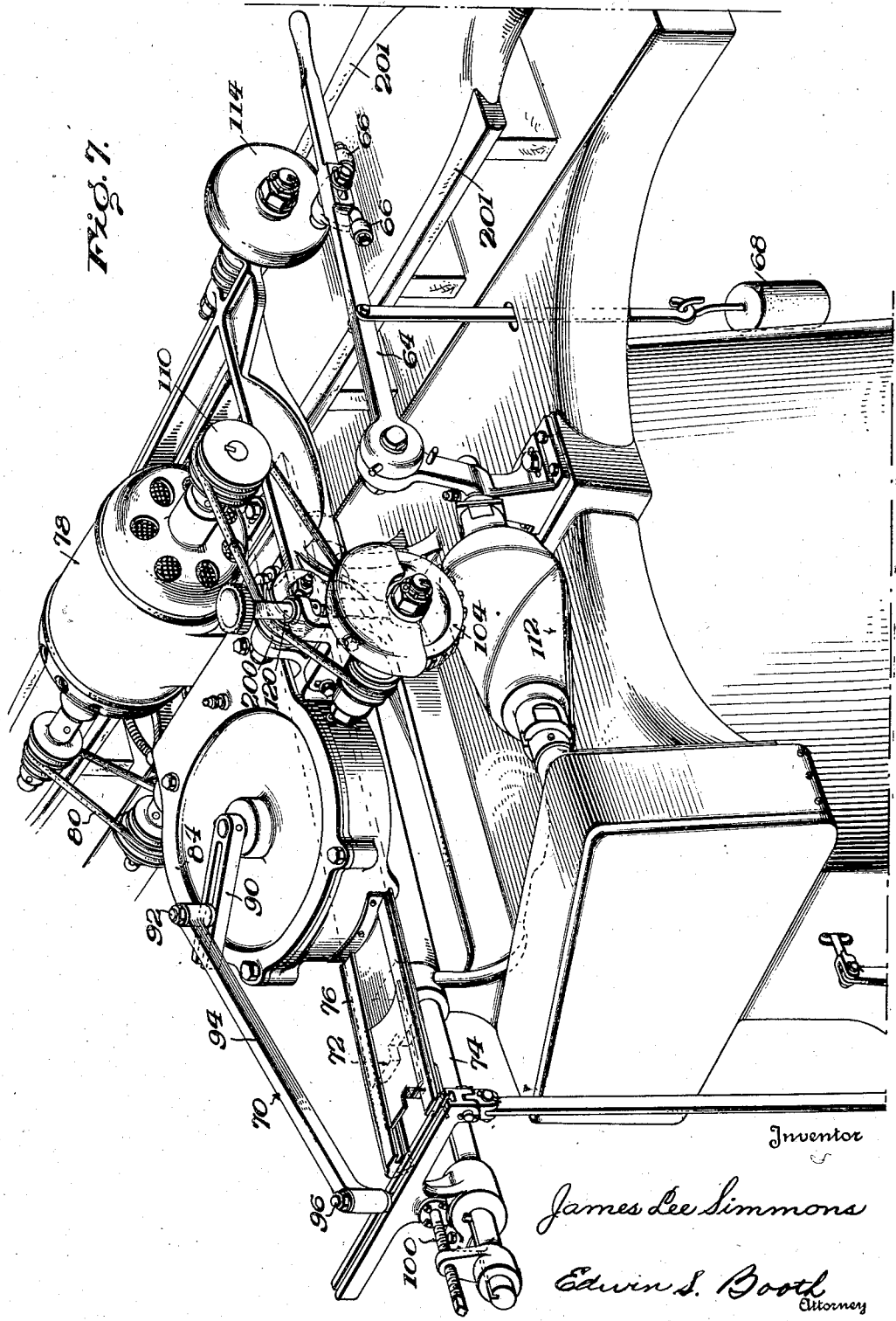

Patented Dec. 22, 1936

2,065,102

UNITED STATES PATENT OFFICE 2,065,102

FORMING MACHINE

James Lee Simmons, Colmar Manor, Md., assignor to Engineering and Research Corporation, Washington, D. C., a corporation of the District of Columbia Application June 26, 1934, Serial No. 732,543

15 Claims. (Cl. 90—13.7)

This invention relates to forming machines and more particularly to machines for forming propeller blades.

In the manufacture of propeller blades, and particularly metallic propeller blades, rough forgings or blanks are made and these are finished by hand. This operation is extremely slow and expensive and requires much tedious work by skilled mechanics to obtain the proper configuration and balance. In my prior Patent No. 1,336,659, granted April 13, 1920, I disclosed a machine for forming propeller blades, particularly wooden or laminated blades, and the present invention is an improvement of the machine disclosed in this patent.

According to the present invention there is provided a machine constituted by a work support mounted for straight line movement in a horizontal plane for carrying a blank to be finished. A carriage is mounted for reciprocation on a bed secured to a rod rotatably mounted on the machine and forming an elongated pivot extending at right angles to the direction of motion of the work support and is so balanced about the pivot that the correct pressure is exerted on the forming or cutting tool. An electric motor mounted on the carriage to form a self contained unit causes the carriage to reciprocate and at the same time drives a rotary cutting or forming tool which forms the blank. The position of the carriage about its pivot and consequently the vertical position of the forming tool as it travels across the blank is determined by a pattern or cam rotatably mounted on an axis parallel to the carriage axis and engaged by a follower roller on the carriage so that as the carriage reciprocates the forming tool will be raised or lowered and the blank will be formed in accordance with the configuration of the pattern.

The cam is preferably formed by mounting a finished blade on the work support and a blank on the cam mounting and reversing the positions of the follower roller and forming tool on the carriage. The cam will be formed to correspond to the finished blade and can either be formed directly or a pattern can be made from which the finished cam is cast. Then upon again reversing the follower roller and cutting tool a number of blades can be made from the cam, each of which will correspond exactly to the blade from which the cam was made. Preferably a separate cam is made for each side of the blade and after one side is finished the blade is turned over and another cam mounted on the machine for finishing the other side of the blade.

As the work support is moved along the cam is rotated so that the portion of the cam corresponding to the section of the blade being formed at the time will be engaged by the follower roller. This is preferably done by the reciprocation of the carriage, there being a member on the carriage adapted to engage lugs adjustably mounted on a rod which is slidably supported by the machine and which operates pawls engageable with gearing meshing with a rack on the work support and a gear drive for rotating the cam. By adjusting the lugs the amount of motion of the work support and of rotation of the cam for each movement of the carriage can be adjusted. The pawls are preferably double acting so that the work support is advanced at each stroke of the carriage and the forming tool will cut a new portion of the blank on each stroke in each direction.

There is also provided another cutter for profiling the blade or forming the desired contour of its edges simultaneously as the first forming operation is preformed. This cutter is preferably constituted by an electric motor mounted at the side of the work support with its axis vertical and a frame pivoted about the motor axis and carrying a cutting tool driven by the motor. There is a pattern or cam mounted on the work support and a follower on the frame engaging the pattern so that as the work support moves along the cutter will be swung in or out to form the desired profile on the blade.

Other novel features and advantages and further objects of the present invention will appear from the following detailed description taken in connection with the accompanying drawings which illustrate one embodiment of the invention. It will be understood, however, that the drawings are for the purpose of illustration only and are not to be taken as a definition of the limits of the invention, reference being had for this purpose to the appended claims.

In the drawings wherein like reference numerals indicate like parts throughout the several views:

Fig. 1 is a side elevation of a machine embodying the invention;

Fig. 2 is a plan view of the machine shown in Fig. 1;

Fig. 3 is a disassembled perspective view of the head stock;

Fig. 4 is an elevation view of the work support;

Fig. 5 is a perspective view of a modified form of work support;

Fig. 6 is a perspective view of the feeding mechanism; and

Fig. 7 is a perspective view of the machine with the parts in a different position than in Figs. 1 and 2.

Referring more particularly to the drawings there is shown therein a machine embodying the invention constituted by a base indicated generally at 10 adapted to rest on or be secured to the floor and a work support 12 carried by the base. The work support is constituted by a table portion 14 on which is slidably mounted a work supporting bed 16 on which are mounted a head stock 18 and a tail stock 19. The head and tail stocks preferably have projecting portions fitting into a slot in the bed 16 as clearly shown in Fig. 1 so that they can be longitudinally adjusted to accommodate work pieces of different sizes. The bed 16 is also provided with a rack 20 for moving the same as will be described hereinafter.

Referring more particularly to Fig. 3 there is shown a preferred form of head stock for finishing propeller blades as constituted by a member 22 adapted to be secured to the bed 16 and having a bore therein in which is rotatably mounted a cylindrical block 24 provided with a tapered arbor 26 accurately machined to fit into the tapered bore usually provided in the root end of a propeller blade such as that shown at 28. It will be understood that the hole in the blade is accurately machined when the blade blank is formed for subsequent use in mounting the blade on aircraft or it may be machined with a smaller bore than that used in mounting the blade and subsequently altered for mounting. In any event when the arbor 26 is inserted therein the blade is accurately aligned on the machine. The root end of the blade is likewise provided with a pair of diametrically opposed holes 30 for use in mounting it on an aircraft and use is made of these holes to further align the blade by providing an elongated pin 32 adapted to extend through a slot 34 in the block 24 and enter one of the holes 30 to determine the relative radial positions of the blade and block 24. The radial position of the block 24 in the member 22 is determined by a pin 36 extending through a hole 38 in member 22 into a corresponding hole in block 24. When it is desired to turn the blade over to finish the other side the pin 36 is removed and put into a hole 40 axially displaced from hole 38 and which corresponds with a second hole in the member 24 diametrically opposite to the first so that when pin 36 engages the second hole turning of the blade through exactly 180° is assured. After the blade is in place it is securely clamped by a clamp 42 which engages the usual flange at the root end thereof and which has a tightening screw 44 engaging the end of block 24 to secure it to the blade.

The tail stock 19 is provided with a centering pin 46 adapted to be inserted in a centering hole in the tip end of the blade to steady the same and adjustable supports are preferably provided along the length of the bed 16 to support the blade intermediate its ends during the forming operation. As shown in Fig. 4 these supports are constituted by a base 48 adapted to be secured to the bed and slotted legs 50 secured to the base by bolts 52 so that they can be tightened at any desired point to support the blade as will be understood. Thus the blade will be rigidly supported throughout its length and flexing or chattering thereof during the forming operation will be prevented.

In Fig. 5 there is shown a modified form of blade supports constituted by base members 54 and plates 56 secured thereto and having their upper surfaces formed to fit the propeller blade. It will be understood that this form of blade support is intended to be used with blades one side of which has been finished so that the blade will accurately fit the upper surfaces of plates 56. The plates are secured to the base members by suitable fastening devices 58 and each plate is provided with a pair of holes 60 through which pins on the base member extend to accurately locate the plate. If it is desired to form a blade of reverse pitch the plates 56 are removed and turned over so that they will properly support a blade slanting in the opposite direction. The plates 56 are preferably cut away at the sides to varying degrees as indicated at 62 so the upper surfaces thereof will vary in width to correspond to the varying widths of the propeller blade along its length.

In order to further steady the blade during the forming operation there preferably is provided an arm 64 pivoted to the base 10 and carrying rollers 66 resting on the blade. The arm is urged downwardly by suitable means such as a weight 68 to force the blade firmly against its supports and eliminate any tendency to chatter.

The forming mechanism proper is constituted by a carriage indicated generally at 70 slidably mounted on a bed 72 which is rigidly secured to an elongated rod 74 rotatably mounted on the base 10 and extending at right angles to the work support. The carriage is constituted by an elongated base 76 which slidably engages the bed 72 and to which is secured a suitable electric motor 78. The motor is drivably connected through a belt 80 with a worm 82 mounted in a casing 84 which is secured to the base 76. A worm gear 86 in the casing 84 meshes with the worm and has a central shaft 88 projecting upwardly through the casing to which is secured a slotted arm 90. A suitable bolt 92 extends into the slot 90 so that it may be secured at any desired point and has pivoted at its upper end a link 94 which is pivoted at its opposite end to a bolt 96. The bolt 96 extends into a slot in a member 98 so that it can be secured at any point in the length of the slot. The member 98 is slidably keyed to the rod 74 and is adjustably held against lengthwise movement thereon by a bolt 100 rotatably secured to the member 98 and threaded through a member 102 which is rigidly secured to the rod 74. By adjusting the bolt 100 the position of the carriage with respect to the rod 74 can be adjusted while the length of the stroke of the carriage can be adjusted by moving the bolt 92 along the rod 90. If desired a quick return motion, that is a faster motion in one direction than in the other, can be attained by moving bolt 96 along the member 98 to either side of the center, the difference in speed of the strokes in opposite directions and the direction in which the quick return occurs being determined by the direction and amount of movement from center of the bolt 96.

A suitable forming tool shown as a rotary cutter 104 is mounted on a shaft 106 rotatably mounted in bearings at one side of the carriage, the shaft being provided with a pulley 108 which is drivably connected with a pulley 110 on the motor shaft by a suitable belt. As the carriage reciprocates the cutter passes across the work piece or blade and forms the same in a manner to be more fully described hereinafter.

In order to control the position of the carriage about its pivot and hence the vertical relation of the cutter with respect to the work support and work piece, a suitable cam or pattern 112 is provided mounted on a rotatable axis on the base 10 parallel to the pivot rod 74. A roller or follower 114 is connected to an axle 116 which is rotatably mounted on the carriage and which has a pulley 118 secured thereto for a purpose to appear hereinafter. The vertical position of the axle 116 with respect to the carriage can be adjusted by a suitable screw 120 thus varying the vertical relation of the cutter with the cam and providing a convenient means for regulating the depth of cut taken by the cutter. It will be understood that the carriage is so balanced about the pivot rod 74 that it tends to tip in the direction of the cam, being prevented by contact of the roller with the cam, and that the balance is so regulated that the optimum pressure for proper operation of the machine is obtained.

In order to move the work support and rotate the cam the mechanism illustrated particularly in Fig. 6 is provided. This mechanism is constituted by a rod 122 slidably mounted on the base 10 and having lugs 124 adjustably secured thereto. An arcuate member 126 is secured to the carriage and engages one of the lugs 124 at each stroke of the carriage to slide the rod 122 longitudinally. To the rod 122 is secured a rod 128 the end of which is pivoted to an upright 130 rigidly connected to one end of a bell crank lever 132. The center of the bell crank lever is pivoted on a fixed pivot 134 on the base 10 and at its other end is pivoted to a link 136 which is pivoted to a bar 138. The bar 138 is pivoted to and supported by arms 140 which are pivoted on the base 10 and a pair of reversible pawls 142 are likewise pivoted to arms 140 by pins 144. At the upper end of each pawl is pivoted a rod 146 extending through a bracket 148 and a spring 150 surrounds the rod 146 and acts between a shoulder thereon and the bracket 148 so that the pawl and rod form a toggle whereby the pawl will constantly be urged in one direction or the other. Each pawl is provided with a bifurcated arm 152 rigidly secured thereto and a pin 154 on a vertically adjustable arm 156 is engaged by the bifurcated arms 152 for tilting the pawls to adjust their direction of engagement.

The arm 156 is slotted and a pin 158 secured to the bar 138 passes through the slot to guide the same. At its lower end the arm 156 has rack teeth meshing with a pinion 160 secured to a rod 162 which extends through to adjacent the work support and has secured at its opposite end another pinion 164. The latter meshes with a pinion 166 which is secured to a shaft 168 journaled in the base 10 and which has at its forward end a suitable handle 170. By turning the handle 170 the arm 156 may be adjusted vertically through the intervening gearing to adjust the pawls for engagement in the desired direction through the pin 154 and arms 152 or to hold the pawls in their central position so that they will not engage in either direction. It will be noted that the pawls act in opposite directions so that no matter which direction they are moved one of them is operative thus resulting in a double acting feed as will appear hereinafter.

Mounted on the base 10 in a position to be engaged by the pawls are a pair of intermeshing gears 172 and 174, the gear 172 being mounted on a stub shaft and the gear 174 being mounted on a shaft 176 which extends through the front of the machine. A pinion 178 is secured to shaft 176 adjacent the work support and meshes with a gear 180 which is mounted on a stub shaft and which meshes with the rack 20 on the work support. Thus as the pawls are oscillated one of them will always engage with one of the gears 172 or 174 to move the rack 20 and work support in the same direction, the direction of motion of the work support being reversed by operating handle 170 to reverse the direction of engagement of the pawls. A crank 182 is preferably secured to the end of shaft 176 for moving the work support by hand to any desired position.

The cam 112 is preferably rotated by the same mechanism through a pinion 184 secured to the shaft 176 and meshing with an idler pinion 186 which has bevel teeth 188 formed on one of its faces in mesh with a bevel gear 190 on a worm shaft 192. A worm gear 194 meshes with the worm 192 and is secured to the cam supporting axle so that as shaft 176 rotates the cam 112 will be rotated. Gear 186 and worm 192 are preferably mounted on a pivoted plate 196 adapted to be swung out and secured by a bolt 198 for insertion of an idle pinion between gears 184 and 186 to reverse the direction of the cam for a purpose to appear hereinafter.

In operation of the machine as so far described a finished blade which it is desired to duplicate is mounted on the work support and a cam blank is mounted in place of the cam 112. The positions of cutter 104 and roller 114 are then reversed and the belt removed from pulley 108 and placed around pulleys 110 and 118, an idler pulley 200 preferably being provided to enable the belt to clear the parts of the machine. A sheathing of wood or other suitable material indicated at 201 (Fig. 7) is preferably built up around the edges of the blade to prevent the roller from dropping off of the blade too abruptly during the cam forming operation. Upon closing a suitable control switch 202 the motor is started and causes rotation of arm 90 through the worm 82 and worm gear 86, the arm 90 and link 94 acting as a crank mechanism to cause reciprocation of the carriage. As the carriage reciprocates the roller rolls across the blade and causes the carriage to swing about its pivot according to the contour of the blade thus moving the cutter which is simultaneously driven by the motor, toward and away from the cam blank and cutting a contour on the cam corresponding exactly to the contour of the blade at that point. Toward the end of each stroke of the carriage the member 126 strikes one of the lugs 124 to move rod 122 longitudinally and rock the pawls 142 to simultaneously feed the work support along and rotate the cam blank, the amount of feed at each stroke being governed by the adjustment of the lugs on the rod. Thus at each stroke of the carriage a new section of blade is under the roller and a new section of cam under the cutter so there will be a section of cam for every section of blade. If desired the cam may be cut directly as described above or a wooden block may be placed in the machine and used as a pattern from which to cast a cam from any suitable metal. Preferably a separate cam is made for each side of the blade but if desired a single cam may be used, half of its surface being formed from one side of the blade and the other half from the other.

After the cam is completed the position of cutter 104 and roller 114 is again reversed and a work piece or blank mounted in the work support. Upon starting the motor again the position of the carriage about its pivot and consequently the position of the cutter will be controlled by the cam 112 so that the blank will be formed according to the configuration of the cam and will be an exact duplicate of the finished blade from which the cam was formed.

If it is desired to form a blade corresponding to the first except that it is opposite in pitch the cam 112 is turned end for end and an idle pinion is inserted between the gears 184 and 186 to reverse the direction of rotation of the cam. Then upon operation of the machine a blade will be formed whose proportions and dimensions are the same as the first but whose pitch is reversed. The same result can be attained by leaving the cam and reversing the head and tail stock to turn the blade end for end, the direction of rotation of the cam being reversed by insertion of the idler pinion as described above.

If desired a safety switch may be provided to stop the motor when the work support has moved to a point where the cutter is over the end of the blade or is as close thereto as it is desired for it to go. As shown in Fig. 1 such a device is constituted by a switch 204 connected in the power circuit to the motor and having an operating arm 206 adapted to be engaged by a pin 208 adjustably mounted on the bed 16. By this construction when the bed has been moved to the point where pin 108 strikes arm 206 the switch 204 will be opened and the motor stopped.

A foot pedal 210 having a latch 212 is also preferably provided for raising the carriage about its pivot to raise the forming tool from the work when desired. This pedal has an upwardly extending arm 214 connected through a rod or chain 216 to one leg of a bell crank lever 218 which is pivoted to the base 10. The other end of the bell crank lever is connected through a link 220 with one end of the member 98 so that when the pedal is depressed member 98 and the carriage will be rocked and the forming tool lifted from the work, the parts being held in this position by the latch 212 engaging with a projecting surface on the base 10.

In order to profile the blade or cut the proper edge contour thereon, there is provided a second motor 222 (Fig. 2) mounted adjacent the work support with its axis vertical. Pivotally mounted about the axis of the motor is a frame 224 having a forming cutter 226 rotatably mounted at its upper portion and a follower roller 228 at its lower portion. The cutter is driven by the motor through a suitable belt 230 acting over pulleys on the motor and cutter and a spring 232 is connected to the frame 224 and a stationary part of the machine to bias the cutter toward the blade. The cutter is in the plane of the blade edge and the follower 228 is in the plane of and engages a cam guide 234 mounted on the work support and movable therewith. The cam guide is preferably in the form of an L beam with one edge formed according to the desired contour for one side of the blade and the other edge for the other side of the blade. Thus when one side of the blade is finished and the blade is turned over it is only necessary to turn the cam 234 over to provide the correct guiding surface for the other edge of the blade. The motor 222 is connected in the same circuit as motor 78 and is controlled by the switches 202 and 204 so that both motors will operate simultaneously.

In the operation of this part of the mechanism the cam 234 may be formed by reversing the cutter 226 and roller 228 and shifting the belt 230 to drive the cutter at the lower part of the frame. Then with a finished blade which is to be copied in the work support the frame 224 will be swung in and out by the follower according to the contour of the blade as the work support moves along and the cutter will form the cam to correspond exactly to the edge of the finished blade. Upon again reversing the cutter and follower and operating the machine with a blank on the work support and the roller engaging the cam 234, the edge of the blank will be cut to conform exactly to the configuration of the cam which is exactly the same as that of the edge of the pattern blade.

Thus there is provided by the present invention a novel forming machine particularly adapted for finishing metal propellers in which a blade can be quickly and accurately finished and in which any number of blades of exactly the same dimensions and configuration can be produced. There is further provided a novel machine in which a cam can be made from a pattern blade and any number of other blades can be produced from the cam. The machine also provides a novel and convenient apparatus for profiling the blades quickly and accurately simultaneously as the faces thereof are being formed. The provision of the pivoted carriage enables proper pressure on the forming tool to be easily and readily obtained while mounting of the motor on the carriage and operation of the feeding mechanism therefrom provides a compact unitary structure.

While only one embodiment of the invention has been shown and described it will be obvious to those skilled in the art that many changes might be made or that the same might be embodied in other forms without departing from the scope of the invention. Thus while the illustrated machine is particularly adapted for finishing metal propeller blades it will be apparent that many other articles might be finished thereon or that other changes of a similar nature might be made. Reference will, therefore, be had to the appended claims to determine the scope of the invention.

What is claimed is:

1. A forming machine comprising a base, a work support carried by the base, a carriage slidably mounted on the base on a pivot extending at an angle to the work support to reciprocate transversely of the work support, a forming tool mounted on the carriage and a pattern for determining the position of said carriage about its pivot.

2. A forming machine comprising a base, a work support carried by the base, a carriage slidably mounted on the base on a pivot extending at an angle to the work support to reciprocate transversely of the work support, a forming tool mounted on the carriage, power means on the carriage for operating the forming tool, and a pattern for determining the position of said carriage about its pivot.

3. A forming machine comprising a base, a work support carried thereby, a carriage pivotally and reciprocably mounted on the base to reciprocate transversely of the work support, a forming tool mounted on the carriage and reciprocable transversely across the work support, power means for reciprocating the carriage and means for determining the position of the carriage about its pivot.

4. A forming machine comprising a base, a work support carried thereby, a carriage pivotally and reciprocably mounted on the base, a forming tool mounted on the carriage, power means mounted on the carriage for reciprocating the same, and for operating the forming tool and means for determining the position of the carriage about its pivot.

5. A forming machine comprising a base, a work support mounted on said base for straight line movement, a carriage slidably mounted on said base on a pivot extending at an angle to the work support for pivotal and reciprocating movement, a forming tool carried by said carriage and movable across said work support, a movably mounted pattern for determining the position of said forming tool about its pivot, means for reciprocating said carriage, and means operated by the movement of said carriage for moving said work support and said pattern.

6. A forming machine comprising a base, a work support mounted on said base for straight line movement, a carriage mounted on said base for reciprocating movement, a forming tool carried by said carriage and movable across said work support, a movably mounted pattern for determining the vertical position of said forming tool with respect to the work support, means for reciprocating said carriage, and means operated by the movement of said carriage for moving said work support and said pattern, said last named means including a rod slidably mounted on said base, lugs adjustably mounted on said rod whereby the amount of movement of the work support and pattern for each movement of the carriage can be adjusted, a train of gearing having one element engaging the work support and another engaging the pattern, reversible pawls engaging said gearing and connected to said rod to be operated thereby, means for determining the operating direction of said pawls, and a member carried by said carriage for engaging said lugs as the carriage reciprocates.

7. A forming machine comprising a movably mounted support for an article to be copied, means mounting said support for straight line movement, a pivotally mounted carriage reciprocably mounted on a pivot at an angle to the support for movement across said support, a guiding member carried by the carriage and engaging the article to be copied to determine the position of said carriage about its pivot, supporting means for revolvably mounting a cam blank, and a forming tool carried by said carriage for forming said cam blank.

8. A forming machine comprising a movably mounted support for an article to be copied, means mounting said support for straight line movement, a pivotally mounted carriage reciprocably mounted on a pivot at an angle to the support for movement toward and away from said support, a guiding member carried by the carriage and engaging the article to be copied to determine the position of said carriage about its pivot, supporting means for revolvably mounting a cam blank on an axis at an angle to the work support, a forming tool carried by said carriage for forming said cam blank, and power means for reciprocating the carriage whereby said guiding member will be moved across the article and the forming tool will be moved across the cam blank.

9. A forming machine comprising a base, a work support carried by the base, a carriage slidably mounted on the base on a pivot extending at an angle to the work support to reciprocate transversely of the work support, a forming tool mounted on the carriage, and a rotatable pattern for determining the position of the carriage about its pivot, the axis of rotation of said pattern being substantially parallel to the pivotal axis of said carriage.

10. In a machine for forming propeller blades of non-circular cross section, a work support comprising a table, head and tail stocks on said table to engage the ends of a blank to be formed, and a plurality of independently adjustable supports on said table between the head and tail stocks and engageable with the lower surface of the blank to support the intermediate portions of the blank and means engaging the upper surface of the blank to hold the same against said supports.

11. In a machine for forming propeller blades of non-circular cross section, a work support comprising a table, head and tail stocks on said table to engage the ends of a blank to be formed, supports on said table between the head and tail stocks and engageable with the lower surface of the blank to support the same and means engaging the upper surface of the blank to hold the same against said supports.

12. In a machine for forming propeller blades of non-circular cross section, a work support comprising a table, head and tail stocks on said table to engage the ends of a blank to be formed, supports on said table between the head and tail stocks and engageable with the lower surface of the blank to support the same and means movable relatively to the blank and engaging the upper surface thereof to hold the blank against said supports.

13. In a machine for forming propeller blades of non-circular cross section, a work support comprising a table, a plurality of rigid supports on said table on which one side of a blank to be formed rests, and means engaging the other side of the blank to hold the same against said supports.

14. A forming machine comprising a base, a work support slidably mounted on said base to rigidly support a blank to be formed, an elongated rod extending at substantially a right angle to said work support, a carriage pivotally and slidably mounted on said rod, a motor mounted on said carriage, means on said carriage driven by the motor and connected to a relatively stationary part of the machine to reciprocate the carriage on the rod, a shaft on said carriage substantially parallel to the work support for carrying a cutting tool, means for drivably connecting said shaft to the motor, a second shaft on the carriage parallel to and spaced from the first shaft for carrying a follower, and a pattern rotatably mounted on a shaft parallel to said rod to be engaged by said follower for limiting the pivotal position of the carriage about the rod.

15. A forming machine comprising a base, a work support slidably mounted on said base to rigidly support a blank to be formed, an elongated rod extending at substantially a right angle to said work support, a carriage pivotally and slidably mounted on said rod, a motor mounted on said carriage, means on said carriage driven by the motor and connected to a relatively stationary part of the machine to reciprocate the carriage on the rod, a shaft on said carriage substantially parallel to the work support for carrying a cutting tool, means for drivably connecting said shaft to the motor, a second shaft on the carriage parallel to and spaced from the first shaft for carrying a follower, and a pattern rotatably mounted on a shaft parallel to said rod to be engaged by said follower for limiting the pivotal position of the carriage about the rod, and means operated by movement of the carriage to slide the work support on the base and rotate the pattern.

JAMES LEE SIMMONS.